United States Patent
Chin et al.

(10) Patent No.: US 12,145,086 B2
(45) Date of Patent: Nov. 19, 2024

(54) THREE-DIMENSIONAL FLUID FILTER USING MAGNETOSTRICTIVE SENSORS

(71) Applicant: Auburn University, Auburn, AL (US)

(72) Inventors: Bryan A. Chin, Auburn, AL (US);
Zhongyang Cheng, Auburn, AL (US);
Songtao Du, Auburn, AL (US); Pengyu Chen, Auburn, AL (US)

(73) Assignee: Auburn University, Auburn, AL (US)

( * ) Notice: Subject to any disclaimer, the term of this patent is extended or adjusted under 35 U.S.C. 154(b) by 403 days.

(21) Appl. No.: 17/025,409

(22) Filed: Sep. 18, 2020

(65) Prior Publication Data
US 2021/0086113 A1    Mar. 25, 2021

Related U.S. Application Data

(60) Provisional application No. 62/904,294, filed on Sep. 23, 2019.

(51) Int. Cl.
*B01D 35/06* (2006.01)
*A23L 2/72* (2006.01)
(Continued)

(52) U.S. Cl.
CPC ............... *B01D 35/06* (2013.01); *A23L 2/72* (2013.01); *B03C 1/288* (2013.01); *C02F 1/482* (2013.01);
(Continued)

(58) Field of Classification Search
CPC ........... B01D 35/06; A23L 2/72; B03C 1/288; B03C 1/0332; B03C 1/025; B03C 1/286;
(Continued)

(56) References Cited

U.S. PATENT DOCUMENTS

| | | | | |
|---|---|---|---|---|
| 4,468,321 A | * | 8/1984 | St. John | B01D 29/96 210/474 |
| 2007/0056912 A1 | * | 3/2007 | Oder | C10G 2/342 210/695 |

(Continued)

OTHER PUBLICATIONS

Du et. al. 2021 3D Phage-based biomolecular filter for effective high throughput capture of *Salmonella typhimurium* in liquid streams. Food Research International 142: 110181 https://doi.org/10.1016/j.foodres.2021.110181 (Year: 2021).*

*Primary Examiner* — Liam Royce
(74) *Attorney, Agent, or Firm* — Barnes & Thornburg LLP

(57) ABSTRACT

In at least one illustrative embodiment, an electromagnetic filter may include a pipe and a magnetic field generator such as an array of permanent magnets. The magnetic field generator generates a magnetic field through a filter section of the pipe. Multiple filter elements are positioned within the filter section of the pipe. The filter elements include a magnetic material and a biorecognition element to bind with a microorganism. The biorecognition element may be a bacteriophage that is genetically engineered to bind with the microorganism. The magnetic field forces the filter elements to positions within the filter section of the pipe. A fluid media may be flowed from an inlet of the pipe to an outlet of the pipe, through the filter section. The fluid media may be a liquid food such as fruit juice. Other embodiments are described and claimed.

9 Claims, 6 Drawing Sheets

(51) Int. Cl.
    *B03C 1/28*      (2006.01)
    *C02F 1/48*      (2023.01)
    *G01N 29/24*     (2006.01)
(52) U.S. Cl.
    CPC ......... *C02F 1/485* (2013.01); *G01N 29/2412* (2013.01); *A23V 2002/00* (2013.01); *B01D 2201/4069* (2013.01); *C02F 2303/04* (2013.01)
(58) Field of Classification Search
    CPC ............ B03C 2201/18; B03C 2201/22; B03C 2201/26; C02F 1/482; C02F 1/485; C02F 1/484; C02F 1/288; C02F 2303/04; C02F 2209/006; C02F 2209/36; G01N 29/2412
    See application file for complete search history.

(56) References Cited

U.S. PATENT DOCUMENTS

2009/0152176 A1\* 6/2009 Kipp .................... B03C 1/0332
                                                              209/636
2017/0080436 A1\* 3/2017 Chin .................... B03C 1/0335

\* cited by examiner

THREE-DIMENSIONAL FLUID FILTER USING MAGNETOSTRICTIVE SENSORS

CROSS-REFERENCE TO RELATED APPLICATION

This application claims priority to U.S. Provisional Application Ser. No. 62/904,294, filed Sep. 23, 2019, the entire disclosure of which is hereby incorporated by reference.

BACKGROUND

Foodborne illnesses are primarily caused by food contaminated with pathogenic microorganisms in the field or during food processing under insanitary conditions. Hence, surveillance of bacterial contamination of fresh produce through the food supply chain is of great importance to the food industry. However, such surveillance is a challenge since the food supply chain is a lengthy trail with many opportunities to cause food contamination. Food products may be cleaned at the harvesting site, transported to a warehouse, re-cleaned, and repackaged several times before reaching retail outlets.

Typical microbiological methods for pathogen detection, such as colony counting, immunoassay, and polymerase chain reaction (PCR), offer very high sensitivities. However, they require pre-analytical sample preparation, which generally includes sample collecting, separating target pathogen cells from food, increasing cell concentration, and achieving analysis volume from bulk samples before detection. These processes are time consuming, resulting in delays in obtaining the screening results. Also, only small samples (for example, 1 mL samples) are typically evaluated for pathogens. More importantly, food samples have to be delivered to laboratories for culture preparation and analysis. Label-free biosensors are available in today's market. However, they also require sample preparation prior to the actual testing (i.e. sampling from fresh produce, filtration and purification of the collected samples, and injection of the filtered/purified samples into a flow system where a biosensor resides). Due to the complexity of these test procedures and the requirements of expensive equipment and highly trained personnel, current food safety controls mainly rely on control of worker/environment hygiene in the food processing industry, rather than the direct pathogen detection.

Free-standing phage-based magnetoelastic biosensors have been investigated as a label-free wireless biosensor system for real-time pathogen detection. The magnetoelastic biosensor is typically composed of a magnetoelastic resonator that is coated with a bio-molecular recognition element that binds specifically with a target pathogen. Once the biosensor comes into contact with the target pathogen, binding occurs, causing an increase in the mass of the resonator resulting in a decrease in the resonant frequency of the sensor (as well as other characteristic frequencies of the sensor).

Fluids may be filtered for pathogens using a conventional bead filter. The bead filter may include many nanobeads, which may be coated with a bio-molecular recognition element that binds specifically with a target pathogen. To filter the fluid media, the nanobeads may be mixed throughout a relatively small sample (e.g., 1 gallon) of the fluid media, or the fluid media may be passed through a filter bed of nanobeads. However, the nanobeads may trap large debris that is not targeted by the biorecognition element, which may cause the filter to clog.

SUMMARY

According to one aspect, a fluid filter may include a pipe comprising a nonmagnetic material, a magnetic field generator, and a plurality of filter elements. The pipe includes an inlet, an outlet, and a filter section positioned between the inlet and the outlet. The magnetic field generator is configured to generate a magnetic field through the filter section of the pipe. The filter elements are positioned within the pipe in the filter section. Each filter element comprises a magnetic material and a biorecognition element to bind with a microorganism. The magnetic field forces the plurality of filter elements to positions within the filter section of the pipe.

In some embodiments, the magnetic field generator may include a first permanent magnet and a second permanent magnet, wherein the first permanent magnet is positioned adjacent to a first side of the pipe, wherein the second permanent magnet is positioned adjacent to a second side of the pipe opposite the first side, and wherein the magnetic field extends through the filter section of the pipe between the first permanent magnet and the second permanent magnet. In some embodiments, the magnetic field generator may include an electromagnet.

In some embodiments, the magnetic field forces each filter element to extend across a cross-section of the pipe. In some embodiments, the magnetic field forces each filter element to extend perpendicularly to a flow direction of the pipe. In some embodiments, the pipe has a rectangular cross-section.

In some embodiments, the biorecognition element may include a bacteriophage that is genetically engineered to bind with the microorganism. In some embodiments, each filter element may include a magnetostrictive sensor, wherein the magnetic material comprises a magnetostrictive material.

In some embodiments, the inlet is positioned above the outlet to allow gravity flow of a fluid through the pipe. In some embodiments, the fluid filter may further include a fluid pump coupled to the inlet of the pipe. In some embodiments, the fluid filter may further include a controllable valve coupled to the outlet of the pipe.

In some embodiments, the fluid filter may further include a second pipe positioned adjacent to the pipe. The second pipe comprises the nonmagnetic material. The second pipe includes an inlet coupled to the inlet of the pipe, an outlet coupled to the outlet of the pipe, and a filter section positioned adjacent to the filter section of the pipe. A plurality of the filter elements are positioned within the second pipe in the filter section. The magnetic field generator is further configured to generate the magnetic field through the filter section of the second pipe.

According to another aspect, a method for fluid filtration may include flowing a fluid media through a fluid filter. The fluid filter may include a pipe comprising a nonmagnetic material, wherein the pipe includes an inlet, an outlet, and a filter section positioned between the inlet and the outlet; a magnetic field generator configured to generate a magnetic field through the filter section of the pipe; and a plurality of filter elements positioned within the pipe in the filter section, wherein each filter element comprises a magnetic material and a biorecognition element to bind with a microorganism. The magnetic field forces the plurality of filter elements to positions within the filter section of the pipe.

In some embodiments, the fluid media may include a liquid food product. In some embodiments, the fluid media may include wash water. In some embodiments, the method may further include washing a food product to generate the wash water; and collecting the wash water in response to washing the food product. Flowing the fluid media may include flowing the fluid media in response to collecting the wash water. In some embodiments, the fluid media may include process water. In some embodiments, the fluid media may include irrigation water.

In some embodiments, each filter element may include a magnetostrictive sensor, wherein the magnetic material comprises a magnetostrictive material. In some embodiments, the method may further include collecting the filter elements in response to flowing the fluid media through the fluid filter; applying a varying magnetic field to the filter elements in response to collecting the filter elements; and detecting a frequency response of the filter elements while applying the varying magnetic field.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which.

DETAILED DESCRIPTION OF THE DRAWINGS

Figure 1:
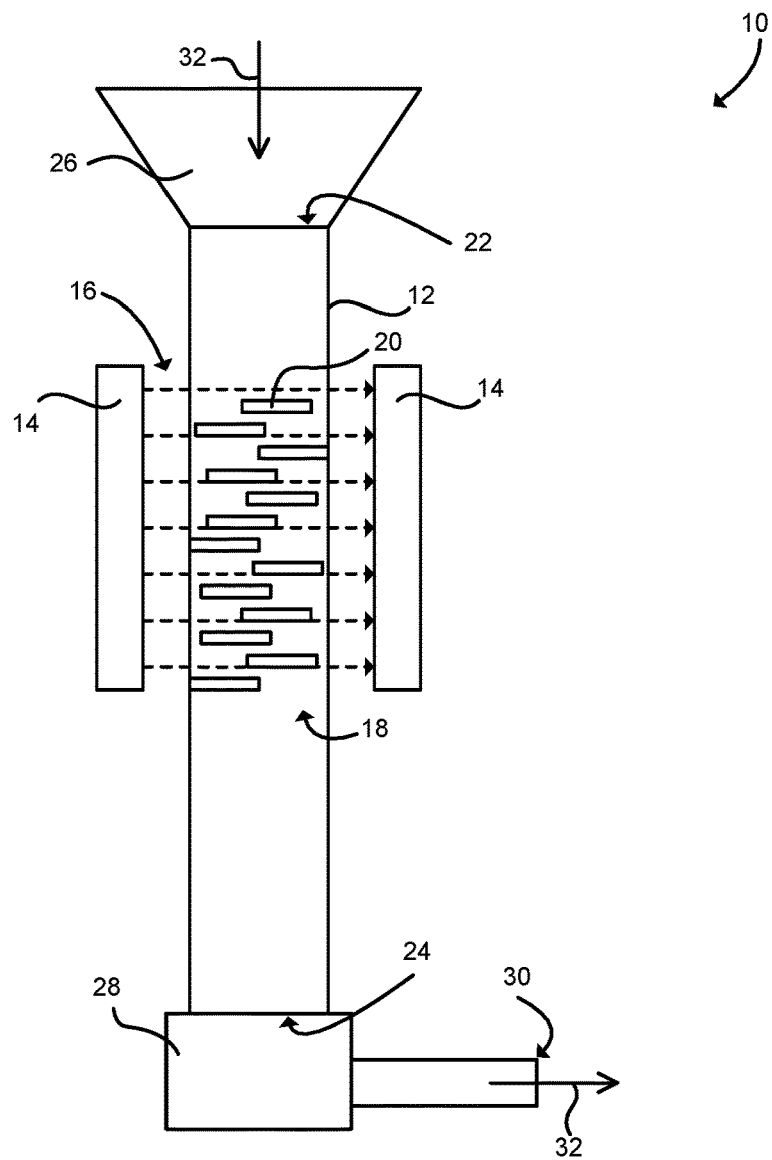
FIG. 1 is a simplified schematic diagram of a three-dimensional filter using magnetostrictive filter elements.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Referring now to FIG. 1, a simplified schematic diagram of one illustrative embodiment of a fluid filter 10 is shown. The fluid filter 10 includes a pipe 12 surrounded by an array of permanent magnets 14. The permanent magnets 14 generate a magnetic field 16 that extends through a filter section 18 of the pipe 12. Multiple filter elements 20 are held within the filter section 18 of the pipe 12 by the magnetic field 16. In use, as described further below, a fluid flows through the filter section 18 of the pipe 12. Targeted contaminants such as pathogens bind to the filter elements 20. As described further below, for certain numbers and/or arrangements of filter elements, capture rates for targeted pathogens may approach 100%. Additionally, the fluid filter 10 may allow large, non-binding debris to pass through the pipe 12, past the filter elements 20 without clogging or otherwise fouling the filter 10. Thus, and as described further below, the fluid filter 10 may be used to filter and detect small concentrations of contaminants (such as pathogens) in large volumes of fluid. Thus, rather than analyzing small (e.g., 1 mL) samples of fluid, the fluid filter 10 may be used to detect the presence of pathogens in an entire volume of fluid. Additionally, the fluid filter 10 may be resistant to clogging in the presence of large debris.

As shown in FIG. 1, the pipe 12 has two ends, an inlet 22 and an outlet 24. The pipe 12 may be formed from any nonmagnetic material capable of transferring fluid, such as PVC, plastic, glass, nonmagnetic metallic material, or as any other material that does not generate an excessively strong magnetic field. The illustrative pipe 12 has a square cross-section. The pipe 12 may be sized for a desired fluid flow rate. For example, in an embodiment for relatively small volumes of fluid, the pipe 12 may have a square cross section of 2 mm by 2 mm. For larger volumes of fluid, the pipe 12 may have a square cross section of 8 mm by 8 mm, 16 mm by 16 mm, or another size. Additionally, although illustrated as having a square cross-section, it should be understood that in other embodiments the pipe 12 be a rectangular tube, circular tube, spiral tube, or any other shaped tube, conduit, or other fluid passageway capable of carrying fluid.

The permanent magnets 14 are illustratively arranged as arrays of magnets positioned on opposite sides of the filter section 18 of the pipe 12. As shown, the magnetic field 16 generated by the magnets 14 is substantially uniform within the filter section 18. Illustratively, the magnetic field 16 may have a strength of about 313 gauss within the filter section 18. The magnetic field 16 generates a magnetic force that holds the filter elements 20 within the filter section 18 of the pipe 12. As shown, the filter elements 20 are forced by the magnetic field 16 to extend across the cross-section of the pipe 12, which may increase surface area of the filter elements 20 exposed to fluid flowing through the pipe 12. The filter elements 20 are held in place within the pipe 12 by the magnetic field 16 and do not require a support frame or other mechanical attachment. Additionally, although illustrated as an array of permanent magnets 14, it should be understood that in some embodiments the filter 10 may include one or more electromagnets or other magnetic field generator capable of generating a uniform magnetic field within the filter section 18 of the pipe 12. Further, although illustrated as a uniform magnetic field 16, in other embodiments the filter 10 may use any magnetic field 16 strong enough to hold the filter elements 20 in place within the pipe 12.

As shown, multiple filter elements 20 are positioned within the filter section 18 of the pipe 12. In the illustrative embodiment, each of the filter elements 20 is a magnetostrictive sensor. The magnetostrictive sensors 20 are small devices made of a magnetostrictive and/or magnetoelastic material coated with a biorecognition element that binds to a particular target particle, such as a pathogen. For example, the biorecognition element may include genetically engineered phages or antibodies that bind to particular bacteria, such as *Salmonella typhimurium*. The magnetostrictive material converts magnetic energy to mechanical energy and vice versa. In other words, magnetostrictive materials generate mechanical strain when the magnetic energy is applied and generate magnetic energy in response to mechanical strain. Throughout this disclosure, the terms magnetostrictive material and magnetoelastic material may be used interchangeably. In the illustrative embodiment, the magnetostrictive sensors 20 are embodied as thin strips of material that may be actuated into resonance by application of a varying magnetic field. The magnetostrictive sensors 20 are illustratively rectangular in shape; however, in other embodiments, any elongated shape, particle, or other shape may be used. Upon contact with the specific target pathogen, the pathogen binds with the biorecognition element and increases the mass of the magnetostrictive sensor 20. This additional mass causes the characteristic frequency of the magnetostrictive sensors 20 to decrease. As described further below, the characteristic frequency may be measured by a pickup coil, allowing quantitative detection and characterization of the pathogen. One embodiment of a magnetostrictive sensor 20 is further described below in connection with FIG. 2. Although illustrated as magnetostrictive sensors 20, it should be understood that the filter elements 20 may be embodied as any magnetic material that is capable of being held in place within the pipe 12 by the magnetic field 16.

The filter 10 further includes a funnel 26 fluidly coupled to the inlet 22 and a valve 28 fluidly coupled to the outlet 24. The valve 28 may be embodied as a ball valve or other valve that is operable to control fluid flow through the filter 10 and out of an outlet 30 coupled to the valve 28. In use, and as described further below, a fluid media 32 may flow through the filter 10 from the funnel 26, through the pipe 12 and the valve 28, and out the outlet 30. The fluid media 32 may be embodied as any fluid that may include pathogens or other contaminant particles. For example, the fluid media 32 may be embodied as a liquid food product (e.g., milk or juice), process water, wash water (e.g., from washing fresh produce), irrigation water, blood or bodily fluids, oil, air, or other fluids. As shown in FIG. 1, the inlet 22 may be positioned above the outlet 24, allowing gravity to force the fluid media 32 through the pipe 12. Additionally or alternatively, in some embodiments, the fluid media 32 may be forced by one or more pumps or other fluid handling devices.

Figure 2:
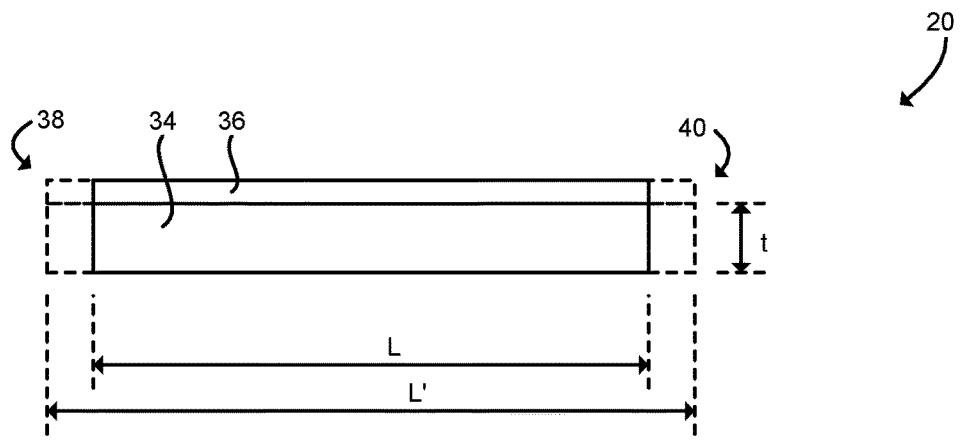
FIG. 2 is a simplified cross-sectional diagram of a magnetostrictive sensor of the filter of FIG. 1.

Referring now to FIG. 2, a simplified schematic diagram of one illustrative embodiment of a magnetostrictive sensor 20 of the fluid filter 10 is shown. The sensor 20 includes a body 34 coated with an immobilized biorecognition element 36. The body 34 is made from a magnetoelastic material, such as a magnetostrictive alloy. In one illustrative embodiment, the body 34 may be mechanically polished and cut (diced) from a strip of METGLAS™ 2826MB, which is commercially available from Honeywell Inc., of Conway, S.C.. As shown, the body 34 has two ends 38, 40. As shown in FIG. 1, when the sensor 20 is held in place by the magnetic field 16, one of the ends 38, 40 may contact an interior wall of the pipe 12. Additionally, although illustrated as including a single side of the body 34 coated with the biorecognition element 36, it should be understood that in some embodiments two or more sides of the body 34 may be coated with the biorecognition element 36.

In the illustrative embodiment, each magnetostrictive sensor 20 has a length L, a thickness t, and a width w (not shown). For example, in some embodiments the magnetostrictive sensors 20 may be one millimeter in length, four millimeters in length, eight millimeters in length, or another length. The particular length L of the magnetostrictive sensor 20 may be selected based on the interior size of the pipe 12. For example, sensors 20 of length 1 mm may be used with a 2 mm by 2 mm pipe 12, and sensors 20 of length 4 mm and/or length 8 mm may be used with an 8 mm by 8 mm pipe 12 or a 16 mm by 16 mm pipe 12. Similarly, sensors 20 of length 1 mm may be used with a 20 mm by 20 mm pipe 12 or any other pipe with an opening greater than 1 mm in width.

Each magnetostrictive sensor 20 is in the shape of a thin strip, meaning that the length L is larger than the width w and much larger than the thickness t (i.e., L>w>>t). Upon application of a varying magnetic field, the dimensions of the magnetostrictive sensor 20 change. Accordingly, the magnetostrictive sensor 20 mechanically vibrates in response to the varying magnetic field. In particular, due to its thin strip shape, the magnetostrictive sensor 20 vibrates mainly longitudinally; in other words, when an oscillating external magnetic field is applied, the magnetostrictive sensor 20 vibrates between the length L and a length L'. The fundamental resonant frequency of this longitudinal oscillation is given as:

$$f_0 = \frac{V}{2L}, \quad (1)$$

where V is the acoustic velocity of the material along its length L. Addition of a small mass ($\Delta m \ll M$) on the magnetostrictive sensor 20 surface causes a change in the resonant frequency ($\Delta f$). This resonant frequency change is proportional to the initial frequency $f_0$ and the mass added ($\Delta m$) and is inversely proportional to the initial sensor mass M. Assuming the added mass is uniformly distributed on the surface of the magnetostrictive sensor 20, the resonant frequency change may be approximated as:

$$\Delta f = -\frac{f_0 \Delta m}{2M} \quad (\Delta m \ll M). \quad (2)$$

The negative sign in Equation (2) means that the resonant frequency of the magnetostrictive sensor 20 decreases with the increase of the mass load. The additional mass load on the magnetostrictive sensor 20 can be obtained by measuring the shift in the resonant frequency (or another characteristic frequency related to the resonant frequency).

When the magnetostrictive sensor 20 comes into contact with a target pathogen, the biorecognition element 36 immobilized on the magnetostrictive sensor 20 surface will bind/capture the target pathogen. This adds an additional mass load on the magnetostrictive sensor 20. As described above, this additional mass causes a drop in a characteristic frequency of the magnetostrictive sensor 20. Therefore, the presence of any target pathogens can be identified by monitoring for a shift in the characteristic frequency of the magnetostrictive sensor 20. Additionally or alternatively, rather than a biorecognition element 36, the magnetostrictive sensor 20 may include a chemical layer that similarly binds with one or more contaminants such as mercury or heavy metals.

The simple strip-shaped configuration of the illustrative magnetostrictive sensor 20 described above may make fabrication relatively easy and/or inexpensive. Additionally, the magnetostrictive sensors 20 are passive sensors that do not require on-board power. As described above, the magnetostrictive sensor 20 may be fabricated by mechanical methods (e.g., polish and dice) or by microelectronics fabrication methods (e.g., sputter deposit, thermal deposit, or electrochemical deposit). These methods can mass-produce fabricated magnetostrictive sensors 20 with very low cost. Additional details of illustrative magnetoelastic ligand detectors are described in U.S. Pat. No. 7,759,134 ("Magnetostrictive Ligand Sensor"), the entire disclosure of which is incorporated herein by reference.

As described above, the biorecognition element 36 may be immobilized on the surface of each magnetostrictive sensor 20 to bind a specific target pathogen. In the illustrative embodiment, the biorecognition element 36 is a genetically engineered bacteriophage ("phage"). The use of phages as a substitute for antibodies offers a stable, reproducible, and inexpensive alternative. In particular, phages have high affinity for binding with target pathogen cells, the phage structure is robust and stable, and phages may bind target pathogens in air with certain humidity. In other embodiments, the biorecognition element 36 may be a traditional antibody, DNA, RNA, proteins, aptamers, or other biorecognition elements. Additionally or alternatively, in some embodiments, the biorecognition element 36 may be embodied as a chemical binding element or an interaction layer immobilized on the body 34 of the magnetostrictive sensor 20. Specific ligand recognition devices that may be illustratively used as the biorecognition element 36, as well as illustrative application methods, are discussed in U.S. Pat. No. 7,138,238 ("Ligand Sensor Devices and Uses Thereof"), U.S. Pat. No. 7,267,993 ("Phage Ligand Sensor Devices and Uses Thereof"), and U.S. Pat. No. 7,670,765 ("Method of Forming Monolayers of Phage-Derived Products and Used Thereof"), the entire disclosures of which are incorporated herein by reference.

Figure 3:
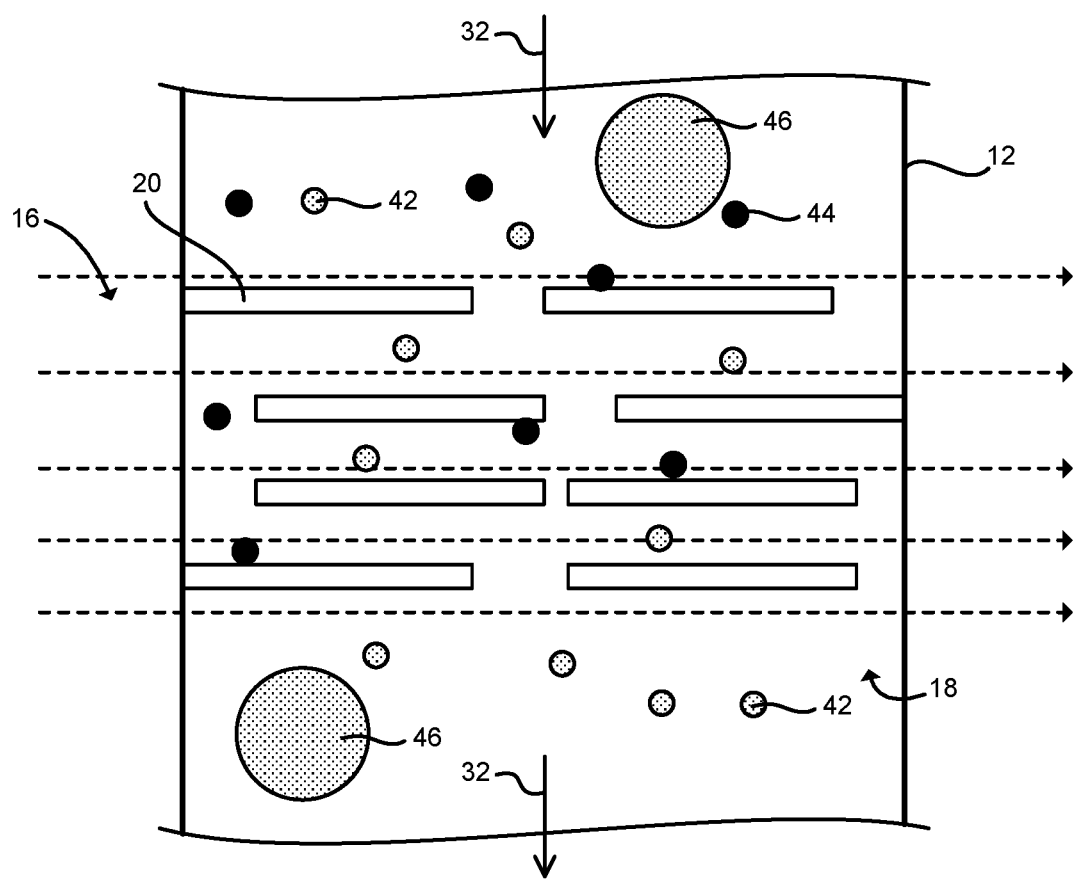
FIG. 3 is a simplified schematic diagram illustrating filtering performed by the filter of FIGS. 1-2.

Referring now to FIG. 3, fluid media 32 flow through the filter section 18 of the pipe 12 is shown. The fluid media 32 entering the filter section 18 of the pipe 12 may include multiple non-binding particles 42 and binding particles 44. The binding particles 44 may be embodied as any pathogen or other contaminant particle to be trapped and removed from the fluid media 32 by the fluid filter 10, such as a microorganism (e.g., bacteria, viruses, spores, mold, or other microorganisms), metallic particles, magnetic particles, chemicals, or any other particle or other contaminant that binds to the filter elements 20. The non-binding particles 42 may be embodied as any other particle or debris included in the fluid media 32, such as a non-binding food component. As the fluid media 32 flows through the filter section 18 of the pipe 12, the binding particles 44 bind to the filter elements 20 and are thereby removed from the fluid media 32. The fluid media 32 leaving the filter section 18 of the pipe 12 may include only non-binding particles 42 without including any binding particles 44 (or including a reduced concentration of binding particles 44).

As shown in FIG. 3, large, non-binding debris 46 may pass through the filter section 18 without binding to the filter elements 20. The open, porous arrangement of the filter elements 20 may allow large debris 46 to pass through the filter section 18 without being trapped or otherwise captured by the filter elements 20. Additionally, in some embodiments, large debris 46 may push against the filter elements 20, and in response each filter element 20 may pivot, bend, flex, shift, or otherwise move within the filter section 18, allowing the non-binding particle 42 to pass through the fluid filter 10. After the non-binding particle 42 passes, the filter elements 20 may be forced back to their original position and/or orientation by the magnetic field 16. Thus, the filter section 18 may filter fluid media 32 that includes large debris 46 with reduced clogging compared to paper filters, bead filters, or other traditional filters.

Figure 4:
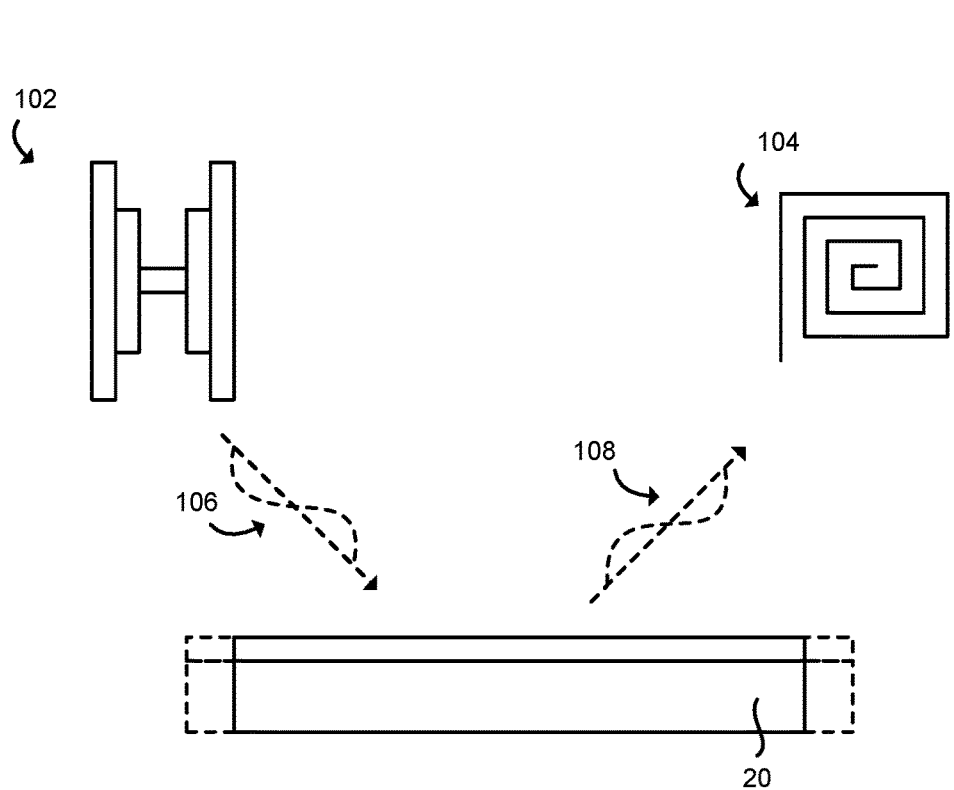
FIG. 4 is a simplified schematic diagram of a system for detecting pathogens captured by a filter element of FIGS. 1-3.

Referring now to FIG. 4, a system 100 for detecting pathogens trapped by the fluid filter 10 is shown. The system 100 includes a drive coil 102 and a pickup coil 104. In use, the drive coil 102 applies a varying magnetic field 106 to one or more magnetostrictive sensors 20. For example, the magnetostrictive sensors 20 may be collected from the fluid filter 10 after filtering fluid media 32. The pickup coil 104 measures a magnetic signal 108 produced by the magnetostrictive sensors 20 in response to the varying magnetic field 106. A characteristic frequency of the magnetostrictive sensors 20 may be determined based on the measured magnetic signal 108. This characteristic frequency is related to the resonant frequency of the magnetostrictive sensors 20, as well as other material properties (e.g., the magnetoelastic coupling coefficient) and the environment (e.g., friction forces or damping effects). As described above, binding particles 44 present in the fluid media 32 flowed through the fluid filter 10 may bind with the magnetostrictive sensors 20, causing an increase in the mass of the magnetostrictive sensors 20 and a corresponding decrease in the characteristic frequency. Thus, the presence of binding particles 44 (e.g., a pathogen or other contaminant) may be determined by determining whether the characteristic frequency shifts. Multiple types of binding particles 44, for example, multiple types of pathogens, may be detected simultaneously by using separate groups of magnetostrictive sensors 20, with each group of magnetostrictive sensors 20 binding to a different type of binding particle 44. Additionally, although described as including both a drive coil 102 and a pickup coil 104, it should be understood that in some embodiments the system 100 may include a single test coil to generate the varying magnetic field 106 and measure the magnetic signal 108 produced by the magnetostrictive sensors 20. In some embodiments, an array of multiple drive coils 102 and/or pickup coils 104 may be used to measure the magnetic signal 108 produced by multiple magnetostrictive sensors 20 simultaneously. The magnetic signal 108 may be used to determine the characteristic frequency of the magnetostrictive sensors 20 as described above. Additionally or alternatively, a single test coil may be used to measure the influence of the magnetostrictive sensors 20 on impedance of that test coil, which may be used to determine the characteristic frequency of the magnetostrictive sensors 20.

Figure 5:
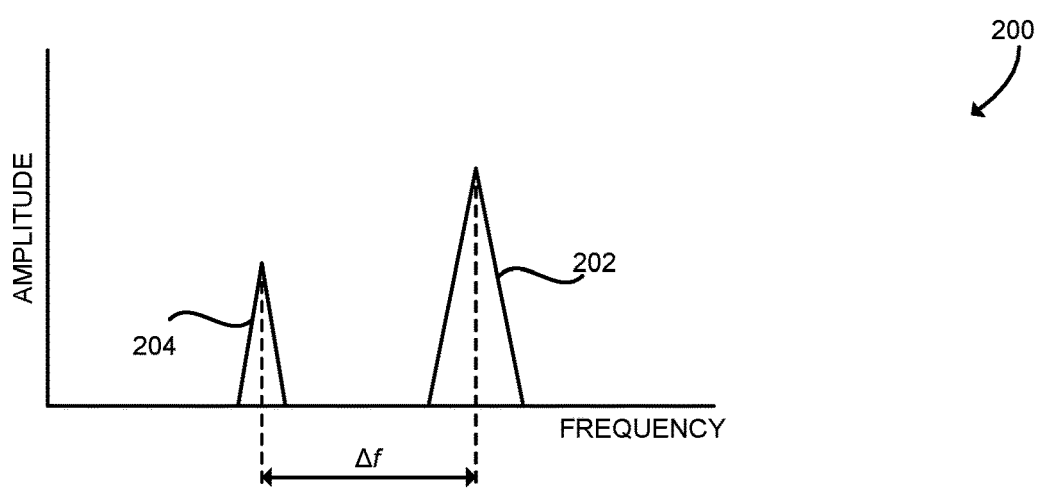
FIG. 5 is an exemplary plot of magnetostrictive sensor frequency response that may be measured using the system of FIG. 4.

Referring now to FIG. 5, an exemplary plot 200 illustrates results that may be measured when binding particles 44 are detected. Plot 200 illustrates signal amplitude against frequency f. Curves 202, 204 illustrate the frequency response for the magnetostrictive sensors 20. Curve 202 illustrates the frequency response for the magnetostrictive sensors 20 when not bound to any binding particle 44, including a strong peak at the unloaded characteristic frequency. Curve 204 illustrates the frequency response of the magnetostrictive sensors 20 when bound to the binding particle 44, including a smaller peak shifted from the unloaded characteristic frequency to a lower frequency by an amount Δf. These results may indicate that some of the magnetostrictive sensors 20 have bound with the binding particle 44 and experienced a frequency shift, a phase difference, or other aspect of the magnetic signal 108.

Figure 6:
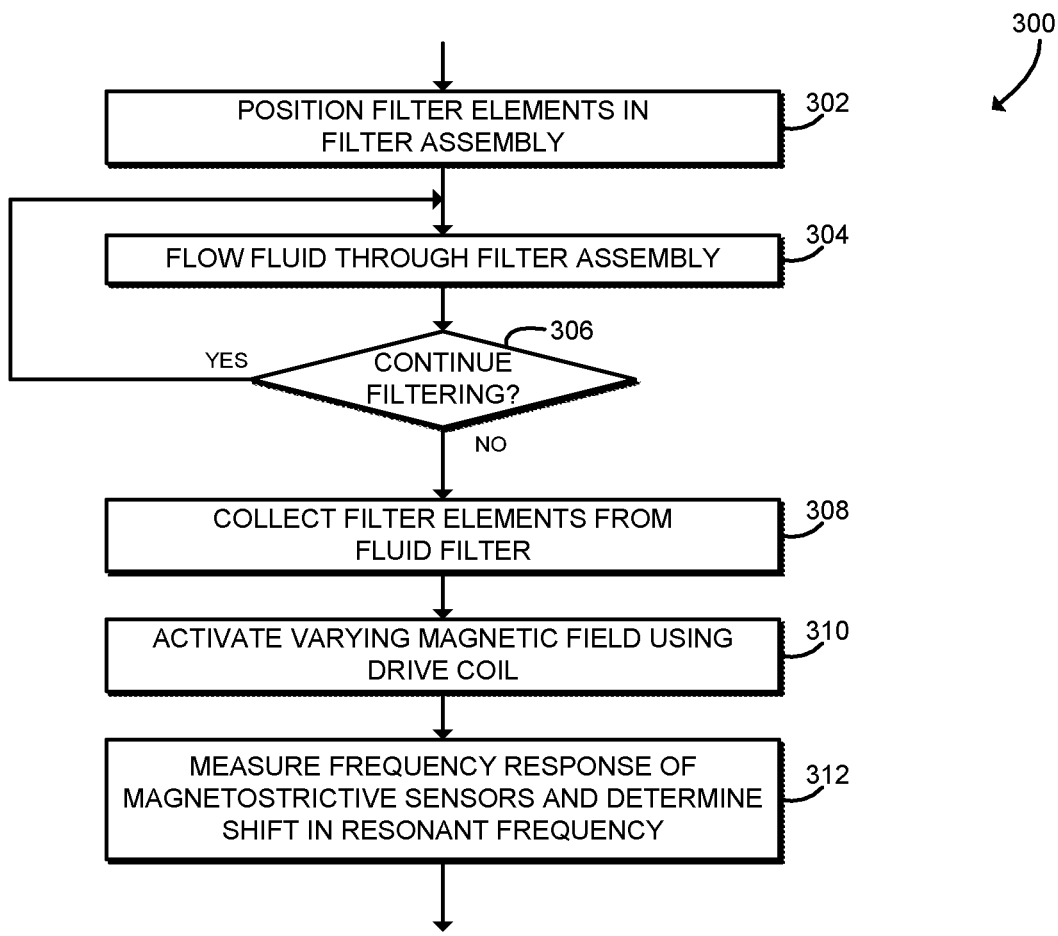
FIG. 6 is a simplified flow diagram of one embodiment of a method for fluid filtering and pathogen detection that may be performed using the filter and system of FIGS. 1-5.

Referring now to FIG. 6, one illustrative embodiment of a method 300 that may be used for fluid filtration and pathogen detection with the fluid filter 10 is shown as a simplified flow diagram. The method 300 is illustrated as a series of blocks 402-312, some of which may be optionally performed in some embodiments. It will be appreciated by those of skill in the art that some embodiments of the method 300 may include additional or different processes and subprocesses.

The method 300 begins with block 302, in which the filter elements 20 are positioned within the filter section 18 of the pipe 12. As described above, the magnetic field 16 extending through the filter section 18 holds the filter elements 20 in place within the pipe 12. When in position, the filter elements 20 may extend across a cross-section of the pipe 12.

In block 304, the fluid media 32 flows through the pipe 12 and thus through the filter section 18 of the pipe 12. As described above, the fluid media 32 may be embodied as any fluid that may include binding particles 44 such as pathogens or other contaminant particles. For example, the fluid media 32 may be embodied as a liquid food product, process water, wash water, irrigation water, blood or bodily fluids, oil, air, or other fluids. The inlet 22 of the pipe 12 and/or the funnel 26 may be coupled to a fluid source, and the outlet 24 and/or the outlet 30 may be coupled to a fluid destination (as well as any intermediate piping). For example, the inlet 22 of the pipe 12 may be coupled to a large tanker truck full (e.g., 1500 gallons) of liquid food such as apple juice or milk, and the outlet 24 of the pipe 12 may be coupled to a similarly-sized destination tank. As another example, the inlet 22 of the pipe 12 may receive wash water created by washing a large amount of produce (e.g., produce from an entire field or other harvest). As the fluid media 32 flows through the filter section 18, any binding particles 44 in the fluid media 32 may bind with the magnetostrictive sensors 20 and become trapped within the fluid filter 10. As illustrated in FIG. 3, any large non-binding particles 46 (e.g., debris) in the fluid media 32 may pass through the filter 10 without binding with the filter elements 20. Binding particles 44 may remain bound to the magnetostrictive sensors 20 even in the presence of large debris. Thus, a large amount of fluid media 32, potentially including debris or other solid material (e.g., non-binding food components), may pass through the fluid filter 10 without clogging.

In block 306, it is determined whether to continue filtering the fluid media 32. In some embodiments, the fluid media 32 may flow through the pipe 12 and the filter assembly 108 until a large sample of the fluid media 32 has been filtered or until the fluid source has completely emptied into the fluid destination. For example, in an illustrative embodiment, 2,000 liters of fluid media may pass through the fluid filter 10 in about 30 minutes, without clogging. Additionally, in some embodiments the fluid media 32 may be filtered through the fluid filter 10 multiple times, which may improve pathogen capture rates. If it is determined to continue filtering, the method 300 loops back to block 304. If filtering is completed, the method 300 advances to block 308.

In block 308, the filter elements 20 are removed from the fluid filter 10. Any technique may be used to remove the filter elements 20. For example, the pipe 12 and/or a part of the pipe 12 (e.g., the filter section 18) may be disconnected from the fluid source and/or destination and the filter elements 20 may be removed. In some embodiments, an electromagnet 14 or other magnetic field generator may be de-energized or otherwise deactivated to remove the filter elements 20.

In block 310, the drive coil 102 of the system 100 is activated to generate the varying magnetic field 106. As described above, the varying magnetic field 106 causes the magnetostrictive sensors 20 to oscillate. The frequency of the varying magnetic field 106 may be varied through a range of frequencies. The range of frequencies may include a characteristic frequency of the magnetostrictive sensors 20 when the binding particle 44 has not been bound (i.e., when the sensors 20 are unloaded). For example, in some embodiments the range of frequencies applied by the drive coil may cover from 50% of unloaded characteristic frequency to slightly more than the unloaded characteristic frequency. Binding of binding particles 44 on the magnetostrictive sensor 20 surface is typically a small mass change, and the decrease in the characteristic frequency of the magnetostrictive sensors 20 due to this small mass change is normally less than 50% of the unloaded characteristic frequency of the magnetostrictive sensor 20. Decreases in characteristic frequency beyond that range are unlikely to be due to binding of binding particles 44. In some embodiments, a uniform magnetic field may also be applied to the magnetostrictive sensors 20, which may bias the sensors 20 and increase the magnitude of the response signal 108.

In block 312, the frequency response 108 of the magnetostrictive sensors 20 is measured using the pickup coil 104, and any shift in resonant frequency of the magnetostrictive sensors 20 is determined. As described above, the magnetostrictive sensors 20 include the biorecognition element 36 that will bind with binding particles 44 upon contact. Binding with the binding particles 44 increases the mass of the magnetostrictive sensor 20, which causes a characteristic frequency of the magnetostrictive sensor 20 to decrease. Thus, a measured shift in the resonant frequency indicates that the binding particles 44 were filtered out of the fluid media 32. After measuring the frequency response 108, the method 300 is complete. The method 300 may be repeated to filter additional fluid media 32.

Although FIG. 6 illustrates the operations of the method 300 as being performed in linear order, it should be understood that in some embodiments those operations may be performed in a different order and/or some of those operations may not be performed. For example, in some embodiments, the fluid media 32 may be filtered with the fluid filter 10 as described in connection with blocks 302-306 without performing detection of the presence of the binding particles 44 as described above in connection with blocks 308-312.

Figure 7:
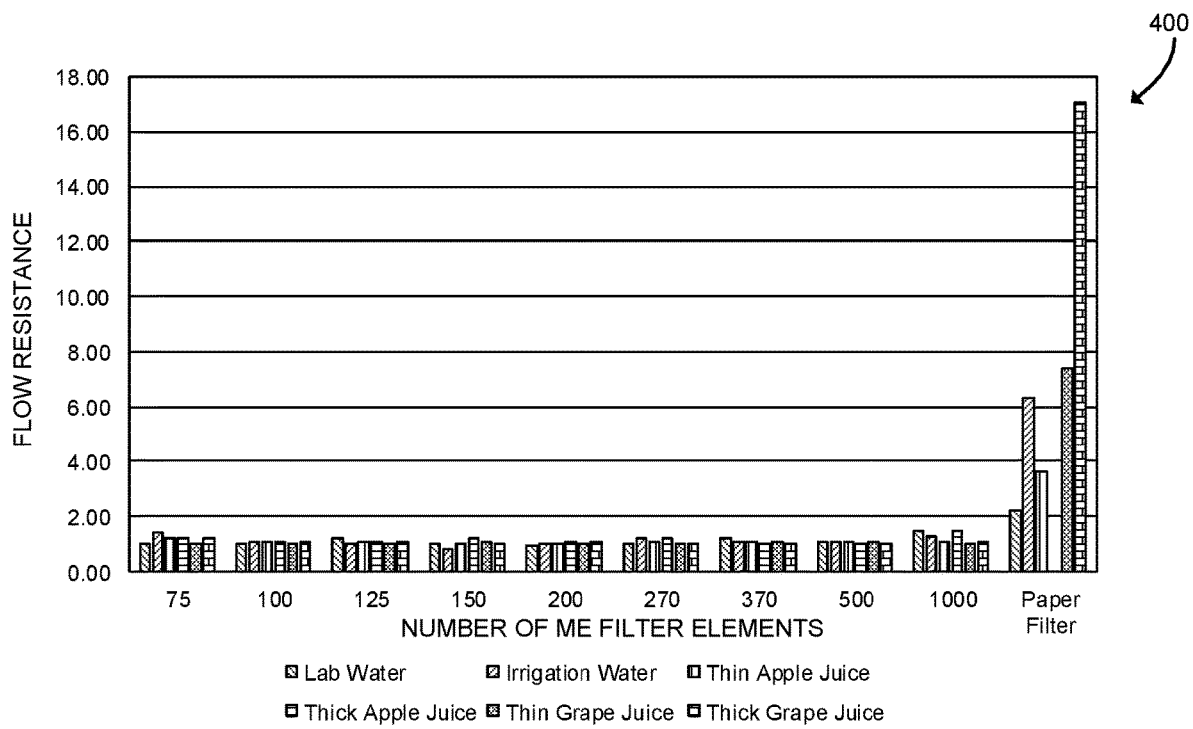
FIGS. 7-9 are plots illustrating experimental results that may be achieved with the filter of FIGS. 1-3.

Referring now to FIG. 7, plot 400 illustrates experimental results that may be achieved with an illustrative embodiment of the fluid filter 10. The plot 400 shows experimentally measured flow resistance for a fluid filter 10 that includes varying number of magnetostrictive filter elements 20 for different types of fluid media 32. The experimental fluid filter 10 included a pipe 12 having a cross section of 8 mm by 8 mm, and filter elements that each had a size of 4 mm by 0.8 mm by 0.03 mm. The fluid media 32 tested included lab water (deionized water), irrigation water (surface water from a local lake), thin apple juice (25% concentrate), thick apple juice (100% unfiltered), thin grape juice (28% concentrate), and thick grape juice (100% unfiltered). All testing suspensions were initially filtered by a 125 μm screen prior to testing. Each of the fluid media 32 was filtered using 75, 100, 125, 150, 200, 270, 370, 500, and 1000 filter elements 20. Additionally, each fluid media 32 was also filtered using a vacuumed-paper filter system (pore size 2 μm).

As shown in FIG. 7, flow resistance for each type of fluid media 32 through the fluid filter 10 was similar for each amount of filter elements 20. This indicates that flow resistance is not strongly affected by increased number of filter elements 20, and that the fluid filter 10 was not clogged during the test. In contrast, the paper filter exhibited higher flow resistance for thicker fluids, indicating that the paper filter was clogged (i.e., blocked pores). In particular, in the thick apple juice test with the paper filter, continuous flow was reduced to droplet flow and the test was not completed in the time allotted, indicating that the paper filter was thoroughly clogged.

Figure 8:
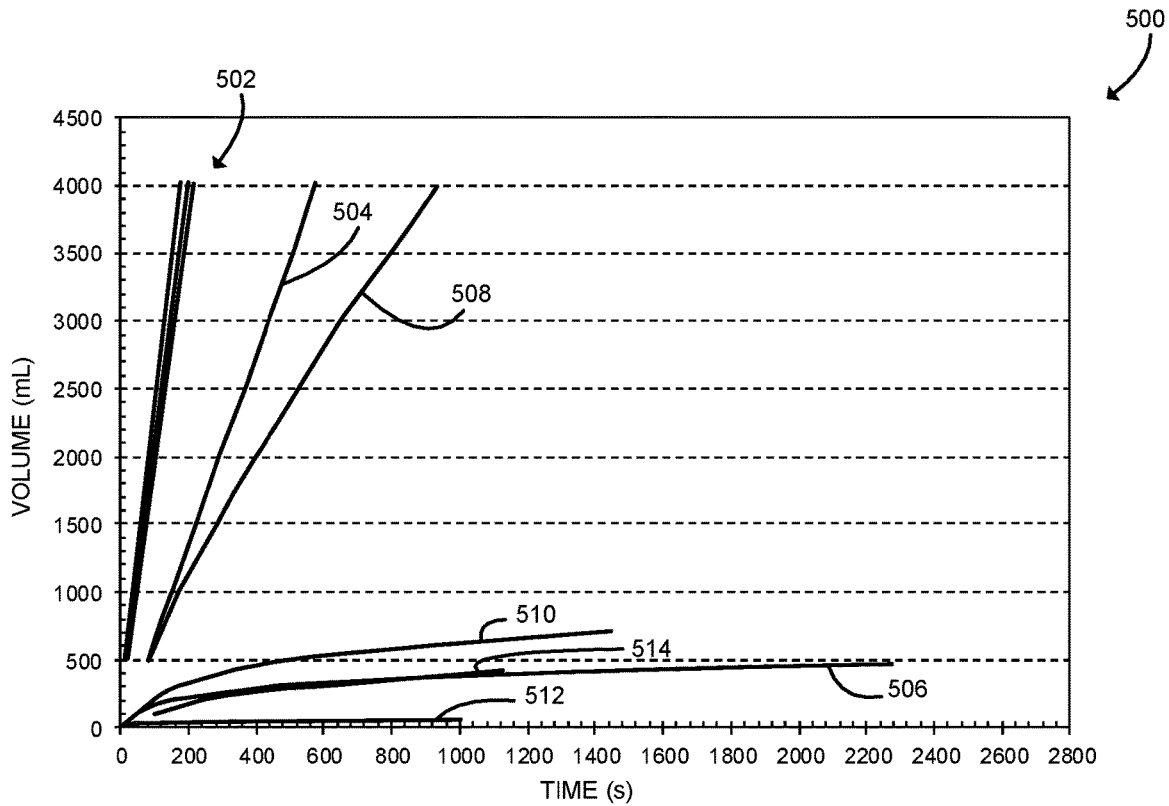

Referring now to FIG. 8, plot 500 illustrates additional experimental results that may be achieved with an illustrative embodiment of the fluid filter 10. The plot 500 illustrates volume of media filtered against time required for filtering. Best-fit curves 502 illustrate experimental results for all test fluids (lab water, irrigation water, thin apple juice, thick apple juice, thin grape juice, and thick grape juice) with the fluid filter 10. Similar to the experiment of FIG. 7, the experimental fluid filter 10 included a pipe 12 having a cross section of 8 mm by 8 mm, and filter elements that each had a size of 4 mm by 0.8 mm by 0.03 mm. All tests shown in FIG. 8 using the fluid filter 10 were performed using 5000 filter elements 20. As shown, the curves 502 for each fluid media are similar. Additionally, the curves 502 are linear, indicating a constant flow rate, meaning that the fluid filter 10 was not clogged by any of the test fluid media.

Best-fit curves 504, 506, 508, 510, 512, 514 illustrate experimental results for test fluids with the vacuumed-paper filter system. The curve 504 shows results for lab water (deionized water). The curve 504 is linear, indicating that the paper filter was not clogged by the lab water (which is expected, because the lab water should not have any suspended particles). The curve 508 shows results for thin apple juice. The thin apple juice had the lowest concentrate percentage tested (25%), and did not appear to block the pores of the paper filter with the volume of fluid that was filtered. In contrast, for the other tested fluid media, flow rate decreased drastically with time, indicating that the paper filter was clogged by the increased quantity of debris and fibers in the continuous flowing suspension. In particular, the curve 506 shows results for irrigation water, the curve 510 shows results for thin grape juice, the curve 512 shows results for thick apple juice, and the curve 514 shows results for thick grape juice.

Figure 9:
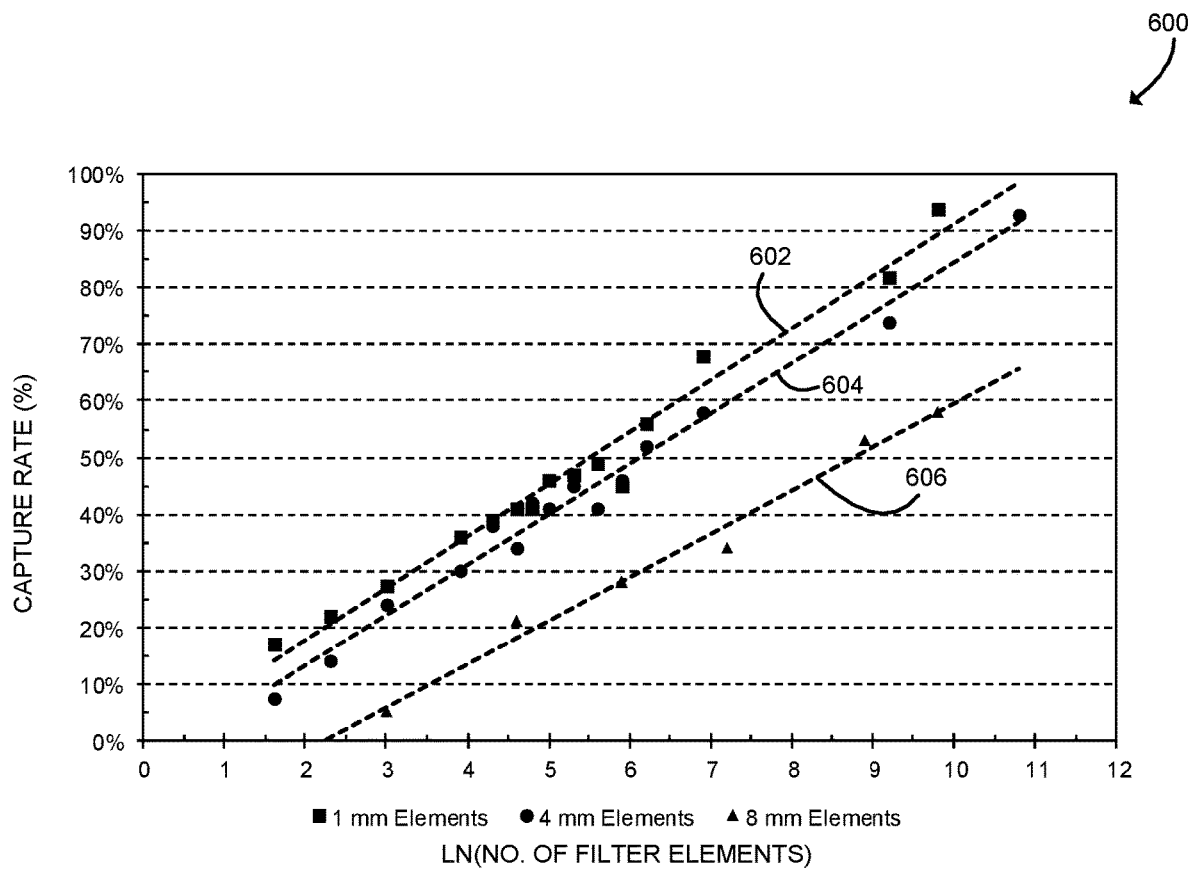

Referring now to FIG. 9, plot 600 illustrates additional experimental results that may be achieved with an illustrative embodiment of the fluid filter 10. The plot 600 illustrates the measured capture rate for *Salmonella* bacteria filtered out of a suspension against the natural log of the number of filter elements 20 included in the fluid filter 10. Tests were performed for filter elements 20 having lengths of 1 mm, 4 mm, and 8 mm. Best-fit line 602 illustrates capture rate against number of 1 mm filter elements, best-fit line 604 illustrates capture rate against number of 4 mm filter elements, and best-fit line 606 illustrates capture rate against number of 8 mm filter elements. As shown, the slopes of each best-fit line 602, 604, 606 are similar, but with different intercepts. As indicated in FIG. 9, capture rates approaching 100% are possible for each size of filter element 20, based on the number of filter elements 20 included in the filter 10.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A fluid filter comprising:
a conduit comprising a nonmagnetic material, wherein the conduit includes an inlet, an outlet, and a filter section positioned between the inlet and the outlet, wherein the filter section extends a first linear distance along the conduit between the inlet and the outlet;
a magnetic field generator positioned outside of an interior of the conduit and configured to generate a uniform magnetic field through the filter section of the conduit; and
a plurality of filter elements positioned within the conduit in the filter section, wherein each filter element comprises a magnetic material and a biorecognition element to bind with a microorganism;
wherein each filter element comprises a magnetostrictive sensor, wherein the magnetic material comprises a magnetostrictive material, and wherein each filter element comprises a strip of the magnetostrictive material extending from a first end to a second end, and having a length and a thickness, wherein the length is larger than the thickness, and wherein the biorecognition element comprises a coating coupled to the magnetostrictive material; and
wherein the magnetic field forces the plurality of filter elements to positions within the filter section of the conduit, wherein the positions of the plurality of filter elements extend the first linear distance within the filter section, wherein the magnetic field forces each filter element to extend across a cross-section of the conduit, and wherein the magnetic field forces the first end of each filter element to contact an interior wall of the conduit and forces the second end of each filter element to a position in the interior of the conduit within the filter section.

2. The fluid filter of claim 1, wherein the magnetic field generator comprises a first permanent magnet and a second permanent magnet, wherein the first permanent magnet is positioned adjacent to an outside of the conduit at a first position, wherein the second permanent magnet is positioned adjacent to the outside of the conduit at a second position different from the first position, wherein the interior of the conduit is positioned between the first permanent magnet and the second permanent magnet, and wherein the magnetic field extends through the filter section of the conduit between the first permanent magnet and the second permanent magnet.

3. The fluid filter of claim 1, wherein the magnetic field generator comprises an electromagnet.

4. The magnetic filter of claim 1, wherein the magnetic field forces each filter element to extend perpendicularly to a flow direction of the conduit.

5. The fluid filter of claim 1, wherein the conduit has a rectangular cross-section.

6. The fluid filter of claim 1, wherein the biorecognition element comprises a bacteriophage that is genetically engineered to bind with the microorganism.

7. The fluid filter of claim 1, wherein the inlet is positioned above the outlet to allow gravity flow of a fluid through the conduit.

8. The fluid filter of claim 1, further comprising a fluid pump coupled to the inlet of the conduit.

9. The fluid filter of claim 1, further comprising a controllable valve coupled to the outlet of the conduit.

* * * * *